Jan. 8, 1952

E. PICK 2,581,878

VALVE MECHANISM FOR CONTROLLING FLOW
THROUGH ION EXCHANGE APPARATUS

Filed June 16, 1947

INVENTOR.

Jan. 8, 1952

E. PICK 2,581,878

VALVE MECHANISM FOR CONTROLLING FLOW
THROUGH ION EXCHANGE APPARATUS

Filed June 16, 1947

INVENTOR.

Jan. 8, 1952     E. PICK     2,581,878
VALVE MECHANISM FOR CONTROLLING FLOW
THROUGH ION EXCHANGE APPARATUS
Filed June 16, 1947     5 Sheets—Sheet 3

INVENTOR.

Nº 1 SERVICE

Nº 2 BACKWASHING

Nº 3 REGENERATING

Nº 4 RINSING

Nº 5 REFILLING

INVENTOR.

Jan. 8, 1952 E. PICK 2,581,878
VALVE MECHANISM FOR CONTROLLING FLOW
THROUGH ION EXCHANGE APPARATUS
Filed June 16, 1947 5 Sheets-Sheet 5

INVENTOR.

Patented Jan. 8, 1952

2,581,878

UNITED STATES PATENT OFFICE 2,581,878

VALVE MECHANISM FOR CONTROLLING FLOW THROUGH ION EXCHANGE APPARATUS

Eric Pick, East Rockaway, N. Y., assignor to The Permutit Company, New York, N. Y., a corporation of Delaware Application June 16, 1947, Serial No. 754,985

2 Claims. (Cl. 137—69)

This invention relates to a valve mechanism for controlling flow through apparatus for treating aqueous solutions of electrolytes by ion exchange materials, all as more fully described and as claimed hereinafter.

Ion exchange materials have come into wide use for the treatment of aqueous solutions of electrolytes. Such materials may be cation exchange materials, usually having sodium or hydrogen as the exchangeable cation. On passing an aqueous solution containing dissolved salts through cation exchange material, the metallic cations in the solution are exchanged for sodium or hydrogen, thus transforming the dissolved salts to sodium salts or mineral acids, respectively. When employing a cation exchanger charged with hydrogen ions, the acid effluent may subsequently be passed through an anion exchange bed, whereby the sulfates, chlorides, etc. are exchanged for hydroxyl ions so that the acidity of the solution is removed.

After such ion exchange materials have exchanged substantially all the ions with which they had been originally charged, their capacity for further exchange becomes exhausted and they must be regenerated for further use. The regeneration in the case of cation exchangers consists of treating the bed with a solution of sodium chloride or a strong mineral acid, depending on whether it is used in the sodium cycle or the hydrogen cycle. The regeneration of the anion exchange material is carried out by treating the bed with an alkali such as sodium hydroxide, sodium carbonate, ammonium hydroxide etc. It is customary to remove accumulated solid impurities from each bed just prior to regeneration by an upward flow of water, termed backwashing, which cleanses and regrades the bed of ion exchange material. After treatment with the regenerant, the bed of ion exchange material is rinsed free of spent and excess regenerant by a flow of water to waste, termed rinsing. Thereupon the bed is in condition to be returned to use and treat another quantity of aqueous solution. Before the next regeneration can be carried out, the supply of regenerant must be replenished, i. e. the tank containing the regenerant must be refilled. The cycle of operations thus consists of five steps: service, backwashing, regenerating, rinsing and refilling.

It is the object of this invention to provide a relatively simple and inexpensive yet efficient multiport valve with which the aforesaid five steps in the operation of an apparatus for treating aqueous solutions may be carried out without reliance on any additional valve means. Other objects will appear from the following description.

The manner in which these objects are achieved is shown in the appended drawings in which.

Figure 3:
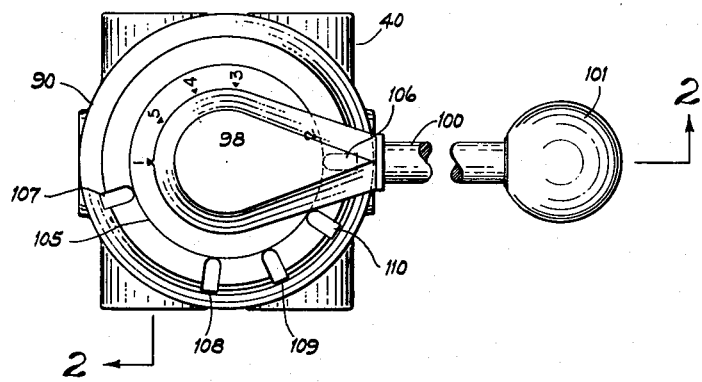
Fig. 3 is a face view of the valve of Fig. 2.
Figure 2:
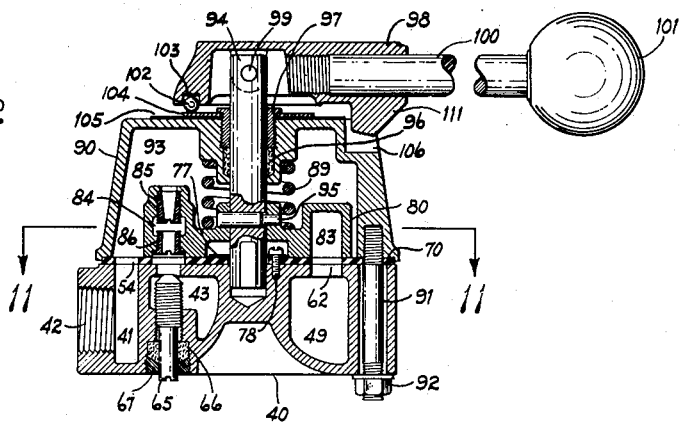
Fig. 2 is a view, partly in cross-section, of the valve mechanism of Fig. 1, taken substantially along lines 2—2 of Fig. 3.
Figures 7, 8, 9, 10:
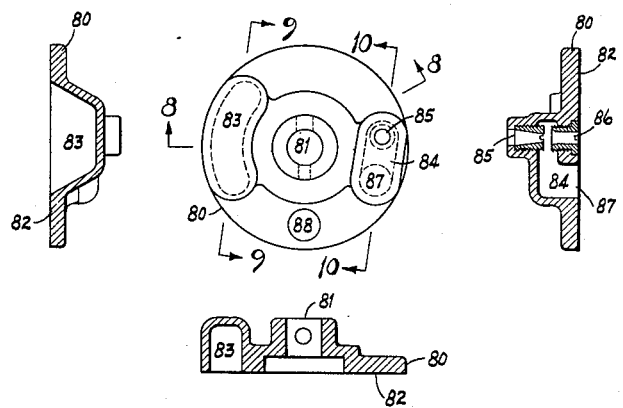
Fig. 7 is a view of the rotor 80 of Fig. 2.
Figure 11:
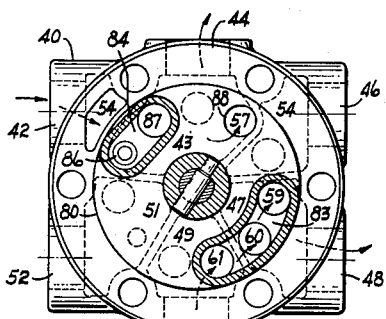
Figure 17:
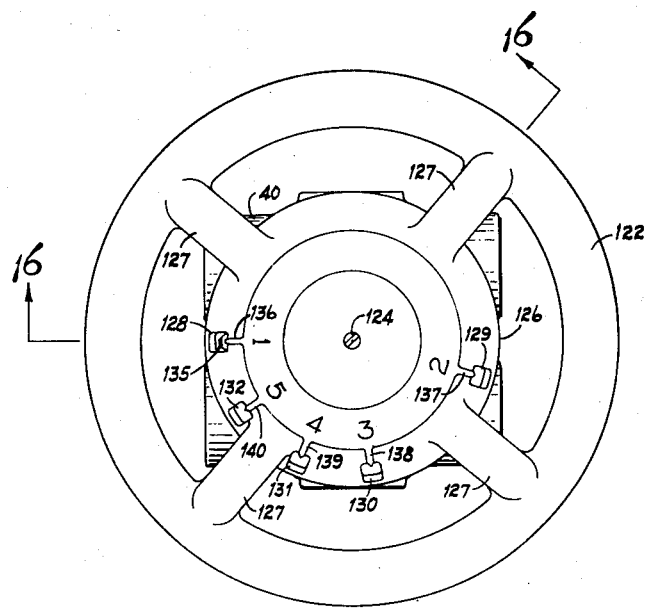
Figure 16:
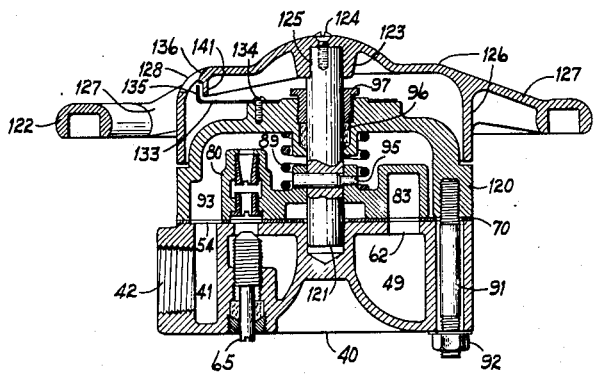

Figs. 8, 9 and 10 are views in cross-section along lines 8—8, 9—9 and 10—10, respectively, of Fig. 7;

Fig. 11 is a view, partly in cross-section along line 11—11 of Fig. 2, with the valve bonnet 90 removed, showing the rotor 80 in the No. 1 or service position;

Figs. 12, 13, 14 and 15 are views similar to that of Fig. 11, but showing the rotor 80 in the No. 2 or backwash, No. 3 or regenerating, No. 4 or rinsing and No. 5 or refilling positions, respectively;

Fig. 16 is a view similar to that of Fig. 2 showing a modification of my valve mechanism partly in cross-section substantially along line 16—16 of Fig. 17; and Fig. 17 is a face view of the valve of Fig. 16, similar to the view of Fig. 3.

Similar numerals are used to identify similar parts throughout the several views.

The apparatus will now be described with the assumption that the ion exchange material is cation exchange material charged with sodium ions, such as is generally used for purposes of water softening.

Figure 1:
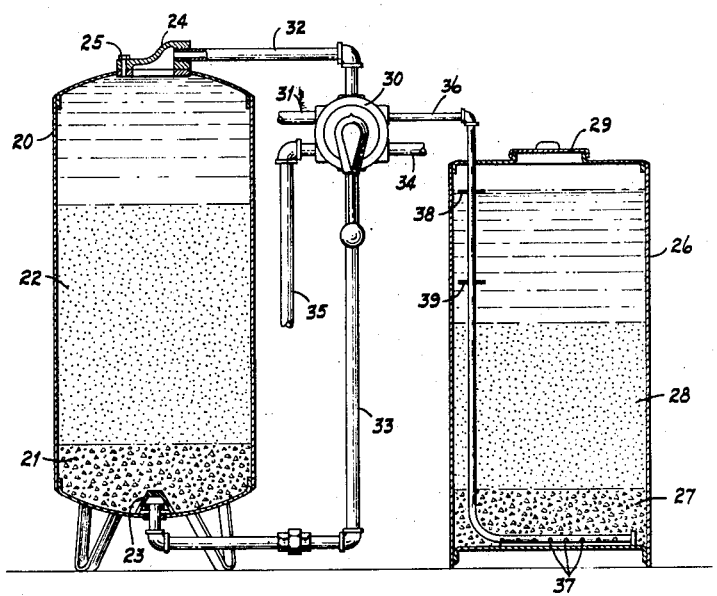
Fig. 1 is a view of an apparatus for treating aqueous solutions provided with a valve mechanism according to my invention.

Referring to Fig. 1, the apparatus comprises a water softener tank 20 containing a layer of gravel 21 supporting a bed 22 of ion exchange material. Attached to the bottom of the tank and surrounded by the gravel 21 is a strainer or distributor 23. Attached to the top of the tank is an elbow fitting 24, secured by means of screws 25. Associated with the water softener tank is a salt tank 26 containing a layer of gravel 27 supporting a supply of salt 28. The tank 26 is provided with a cover 29 upon removal of which its interior may be inspected and the supply of salt 28 replenished.

All flows through the apparatus are controlled by a multiport valve 30, shown in greater detail in Figs. 2 to 15. To the valve 30 are connected an inlet pipe 31 leading from a source of water under pressure, a pipe 32 leading to the elbow fitting 24, a pipe 33 leading to the strained 21, a pipe 34 leading to a point of use for treated water, a waste pipe 35 leading to a point of disposal for waste liquids, and a brine pipe 36 leading to the salt tank 26, as shown. The end of pipe 36 is embedded in the gravel 27 and provided with perforations 37. The pipe 36 also carries two brine markers 38 and 39 to facilitate withdrawal of a predetermined quantity of brine and refilling of the salt tank to a predetermined level.

Figure 4:
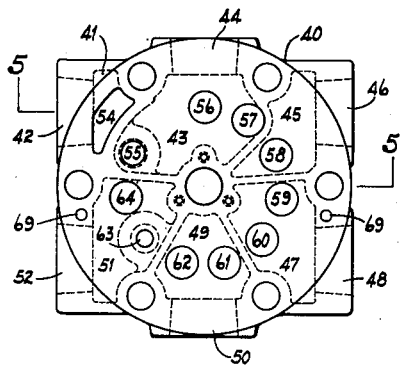
Fig. 4 is a view of the valve body 40 of Figs. 2 and 3.
Figure 6:
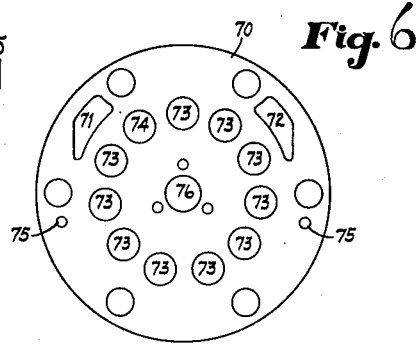
Fig. 6 is a view of the gasket 70 of Fig. 2.
Figure 5:
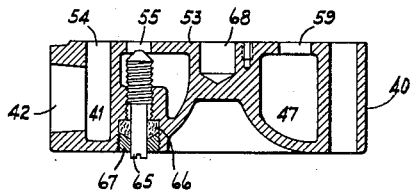
Fig. 5 is a view in cross-section along lines 5—5 of Fig. 4.

The valve 30 of Fig. 1 is shown in greater detail in Figs. 2 to 8. As shown in Figs. 2, 4 and 5 the valve has a body 40 which is provided with an inlet chamber 41 having a threaded opening 42 (into which fits pipe 31, Fig. 1), a chamber 43 having a threaded opening 44 (into which fits pipe 32), a chamber 45 having a threaded opening 46 (into which fits pipe 36), a chamber 47 having a threaded opening 48 (into which fits pipe 34), a chamber 49 having a threaded opening 50 (into which fits pipe 33), and a chamber 51 having a threaded opening 52 (into which fits pipe 35).

The valve body 40 has a flat face 53 with a passage and a number of valve ports therein as follows: Passage 54 communicating with chamber 41, ports 55, 56 and 57 communicating with chamber 43, port 58 communicating with chamber 45, ports 59 and 60 communicating with chamber 47, ports 61 and 62 communicating with chamber 49, and ports 63 and 64 communicating with chamber 51. As shown in Fig. 4 the ports 55 to 64 inclusive, are located on a circle divided into eleven equal port stations with one of said ports located at each station except the one between ports 55 and 56 which is a blank station. The angular spacing between adjacent ports is thus thirty-two and eight-elevenths degrees, except between ports 55 and 56 where it is double that amount. Such spacing is particularly desirable when most of the ports are of the same size as in Fig. 4. In practice, however, it will often be preferable to vary the size of the ports, making certain ones larger and others smaller relative to each other, and in such cases, it will be found advantageous to deviate somewhat from the division of the circle into eleven equal parts in order to obtain the stations for the valve ports. When reference is, therefore, made in the claims to eleven port stations, I wish it to be understood that a reasonable deviation from a division into eleven equal parts is to be encompassed.

As shown in Fig. 5 an adjustment screw 65 is provided which permits throttling of the flow through port 55 so as to adjust the rate of flow through port 55 for a purpose to be explained later. Leakage of water to the outside is prevented by means of packing 66 retained by gland 67. A similar adjusting screw is advantageously provided to control the flow through port 63.

In the center of the flat face 53, the valve body is provided with a bore 68 to provide a socket for valve stem 94. In the flat face 53 are also two pins 69 to fit into corresponding openings in valve bonnet 90 so as to correctly locate body and bonnet relative to each other.

On the flat face 53 of body 40 is located a gasket 70 (Fig. 6) advantageously made of soft rubber or other suitable resilient material. I have found that a gasket having a durometer A hardness of about 75 and a thickness of about one-sixteenth inch gives satisfactory results in valves such as those used in household water softeners. For valves or other sizes and for other purposes, it may be found desirable to employ a gasket of somewhat different thickness, shape and hardness. The gasket has a port 71 adapted to fit passage 54 in the body and ten ports 73 to fit ports 55 to 64. The gasket also has a port 72 being a mirror image of port 71, and a port 74 neither of which matches any port or passage in the valve body. Ports 72 and 74 are thus not necessary, but they are advantageous in that they permit use of the gasket with either of its two faces placed against the body face 53. Where this feature of reversibility is not needed, ports 72 and 74 may be omitted. The gasket also has a central opening 76 to receive the valve stem 94 and two holes 75 to fit over the pins 69. The central portion of the gasket is secured to the valve body 40 by means of an annular plate 77 and screws 78 (see Fig. 2).

A rotor 80, shown in Figs. 7 to 10 has a flat face 82 normally resting against the gasket 70 as shown in Fig. 2. The rotor 80 has port stations matching those in the body 40, a cavity 83 extending over three port stations and opening into the face 82. Diametrically opposite the cavity 83 is a suction passage 84 extending over two port stations and provided at one end thereof with an injector inlet nozzle 85 and an injector outlet nozzle 86 in line with each other, and at its other end with a port 87 opening into the face 82. The rotor is also provided with a through opening 88, at the second station from both the cavity 83 and the port 87.

As shown in Figs. 11 to 15, the rotor, through its cavity 83, passage 84 and through opening 88 is adapted to control flow through the stator ports 55 to 64 inclusive, as will be explained later.

A valve bonnet 90 is attached to the valve body 40 by means of studs 91 and nuts 92 so as to form thereon an enclosed compartment 93 in which the rotor 80 is located. A stem 94 is provided for moving the rotor 80 by means of pin 95 which preferably has a loose fit in either the stem 94 or the rotor 80 so as to permit the rotor to slightly swivel, and thereby be in full contact with the gasket 70 under the urging of a spring 89 and the water pressure in compartment 93. The stem 94 passes through the bonnet, leakage to the outside being prevented by packing 96 and gland 97.

A socket 98 is attached to the outer end of stem 94 by means of a pin 99, which permits the socket to fulcrum on the stem. A lever 100 with a ball handle 101 is screwed into the socket 98. In a small recess in the socket 98 is a hardened steel ball 102 with a hardened steel backing plate 103. The ball 102 is advantageously permanently retained in place by lightly peening the metal of the socket in the vicinity of the ball 102. A hardened steel bearing plate 104 and a dial 105 having the valve positions marked thereon (see Fig. 3) are attached to the bonnet 90 by means of small screws (not shown).

The periphery of the bonnet is provided with notches 106, 107, 108, 109, and 110 corresponding to the operating positions of the valve numbered 1 to 5, respectively, and a projection 111 on the socket 98 is adapted to fit into each of the five notches, thereby locating and retaining the socket 98 and with it the valve rotor 80 in any of the five operating positions. The rotor may be moved from one position to the next by lifting the ball handle 101 so that the socket 98 fulcrums on ball 102, lifting the stem 94 and with it the rotor 80 against the combined action of the spring 89 and the water pressure on top of the rotor 80. When the projection 111 thus clears the notch in which it is resting, the valve lever may be turned with the ball 102 rolling on the bearing plate 104 until the next operating position is reached, whereupon the projection 111 drops into the next notch, and the spring 89, together with the water pressure in compartment 93, forces the rotor 80 downward into tight contact with the gasket 70.

Figure 12:
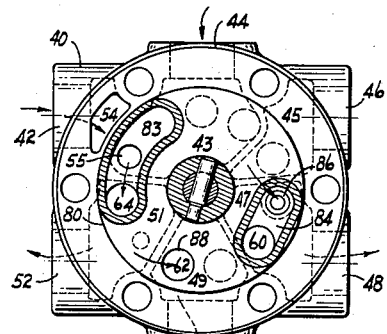

In normal operation of the water treating apparatus, while discharging treated water to service, the rotor is in the No. 1 position shown in Fig. 11. As in all the other positions of the rotor, the water entering through supply pipe 31 passes through chamber 41 and passage 43 into the compartment 93. Thence the water flows through the through opening 88, port 57, chamber 43, and pipe 32 to the top of the tank, downwardly through the bed 22 of ion exchange material and thence through pipe 33, chamber 49, port 61, cavity 83, both ports 59 and 60, chamber 47 and pipe 34 to service. When the ion exchange capacity of the apparatus has been exhausted, it is regenerated by a cycle of operations as follows:

The rotor is moved, as described above, to the No. 2 or backwash position shown in Fig. 12 in which the water from compartment 93 flows via the through opening 88, port 62, chamber 49 and pipe 33 to the bottom of the tank, upwardly through the bed 22 of ion exchange material, cleansing and regrading it, and thence through pipe 32, chamber 43, port 55, cavity 83, port 64, chamber 51 and pipe 35 to a point of disposal. The rate of flow during such backwashing operation must be sufficiently high to actually lift the granules of ion exchange material causing them to rub against each other for cleansing purposes. On the other hand, the rate of flow should not be so high as to carry away any of the ion exchange granules. The best rate of flow depends on the type of ion exchange material used, its specific weight and its grain size. It is usually of the order of about 6 gallons per minute per square foot of bed area. By means of the adjusting screw 65 the desired rate of flow of backwashing can be adjusted to suit the prevailing water pressure, type of ion exchange material and size of unit on which the valve is used.

Figure 13:
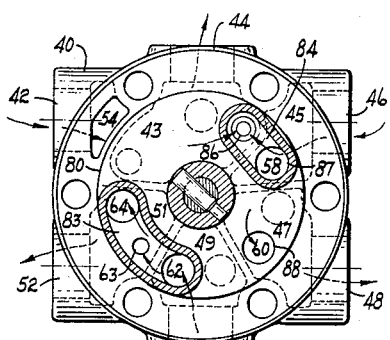

After the bed has been washed clean, as can be judged by the disappearance of dirt in the water flowing to waste through pipe 35, the rotor is moved to the No. 3 or regenerating position shown in Fig. 13. Water flows from the chamber 93 into the injector inlet nozzle 85 producing a suction in passage 84 which draws brine via the perforations 37, pipe 36, chamber 45 and ports 58 and 87. The brine and water mix and are discharged through the injector outlet nozzle 86, port 57, chamber 43, and pipe 32 into the top of the tank to pass downwardly through the bed 22 of ion exchange material, regenerating it. Spent and excess regenerant solution flows to waste via pipe 33, chamber 49, port 62, cavity 83, both ports 63 and 64, chamber 51 and pipe 35.

Figure 14:
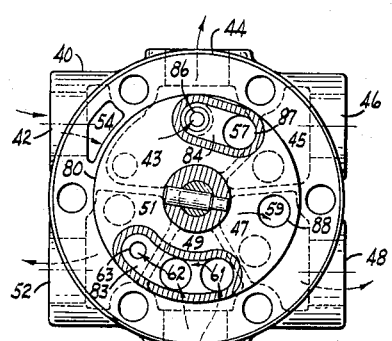

When a sufficient quantity of regenerant has been withdrawn as determined by a drop of liquid level in tank 26 from the marker 38 to the marker 39, the rotor is moved to the number 4 or rinsing position shown in Fig. 14. Water from compartment 93 now flows through the injector nozzles 85 and 86 and port 56 into chamber 43 (the suction thus created in passage 84 causes a certain amount of circulation of water from chamber 43 through ports 57 and 87 back to the injector, but such recirculation is inconsequential). From chamber 43 the water flows via pipe 32 to the top of the tank, downwardly through the bed 22, rinsing it free of excess and spent regenerant, and then passes to waste via pipe 33, chamber 49, both ports 61 and 62, cavity 83, port 63, chamber 51 and pipe 35. It is desirable that this rinsing operation take a time of roughly about one-half hour. If it is carried out too fast, the regeneration will be inefficient and only part of the exchange capacity will be restored to the ion exchange material. If it is too slow, it becomes objectionable to the user. As has been explained above, an adjustment screw similar to that numbered 65 in Fig. 2 is provided to control the flow through port 63. By suitable adjustment of this screw any desired rinse rate may be obtained. Since the rate of flow in rinsing is generally smaller than that in backwashing, the rinse control port 63 can be made somewhat smaller than the backwash control port 55.

Figure 15:
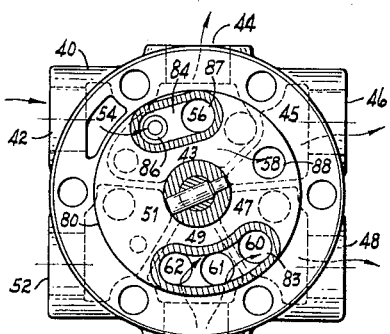

After the bed has been rinsed free of all excess and spent regenerant the valve is moved to the No. 5 or refilling position shown in Fig. 15. In this position water enters from the compartments 93 via the through port 88, port 58, chamber 45, pipe 36 and perforations 37 into the salt tank 26. As the water flows into the salt tank it comes in contact with salt 28 and dissolves some of it to form brine available for the next regeneration. When the level in salt tank 26 has been raised from marker 39 back to marker 38, the rotor is moved to the No. 1 or service position and the apparatus is once more in normal service.

This valve mechanism supplies water to service at all times. While the bed of ion exchange material is being backwashed, regenerated and rinsed, hard water is supplied to the service pipe 34, through the injector nozzles 85 and 86, and port 59 during the backwash (Fig. 12) through port 88 and port 60 during regenerating (Fig. 13) and through port 88 and port 59 during rinsing (Fig. 14). While the valve is in the No. 5 or refilling position (Fig. 15), soft water is available to use, although at a somewhat lower rate of flow, via the injector inlet nozzle 85, passage 84, port 87, port 56, chamber 43, pipe 32, bed 22, pipe 33, chamber 49, both ports 61 and 62, cavity 83, port 60 and chamber 47. The user is thus never left without water which is important in case of fire, for flushing toilets, etc., it usually being preferable having hard water available during regeneration, rather than no water at all.

In Figs. 16 and 17 is shown a modified type of construction in which the rotor is only rotated but not lifted from its seat on the valve body 40 during positioning. Valve body 40 and rotor 80 are identical with those shown in Figs. 2 and 3. The gasket 70 may in this case be entirely omitted between body 40 and rotor 80, a narrow annulus then being provided for a seal between the bonnet 120 and the body 40 in which case the rotor 80 is directly in contact with the body 40. It is advantageous, however, to provide a gasket 70, as shown in Fig. 16, in this case advantageously made of hard, resin impregnated asbestos fabric, such as that known under the trade name Formica, in a thickness of about one-thirty-second or one-sixteenth inch.

In this modification the valve stem 121 has attached to its outer end a hub 123 by means of a screw 124, a flat spot 125 being provided on the stem so as to prevent rotation of the hub on the stem. A cup-shaped portion 126 is provided which is contiguous with the hub 123 and which totally encloses the upper portion of bonnet 120. The cup-shaped portion 126 is connected to an operating wheel 122 by spokes 127. As an alternative to the spokes 127, there may be provided a solid disc extending from the cup-shaped portion 126 to the wheel 122. In the cup-shaped portion 126 are provided openings 128, 129, 130, 131 and 132. Attached to the bonnet 120 by means of screws 134 is a pointer 133 which has a turned up outer end 135 so located as to be visible through the openings 128 to 132. At each of the five openings is a ridge, numbered 136 to 140 and corresponding to the valve positions numbered 1 to 5, respectively. The valve may thus be moved into each of the five positions by turning the wheel 122 and continuing the rotation until the pointer 135 accurately registers with the desired ridge. For improvement appearance, a skirt 141 is provided in back of each of the openings 128 to 132 as shown in Fig. 16.

Operation of an apparatus equipped with the valve mechanism of Figs. 16 and 17 is like that explained in connection with Figs. 11 to 15, except that here the valve is moved by rotation only instead of by lifting, turning and re-seating the rotor. Both types of mechanism perform satisfactorily, and it is a matter of choice as to which type is preferred. The rotor is moved through the entire cycle of 5 operations in the same direction, in this case, counterclockwise. If desired, the port arrangement may be reversed for clockwise operation.

While the valve mechanism has been described with particular reference to a cation exchange material charged with sodium ions, it may be used equally successfully with cation exchange material charged with hydrogen ions or with anion exchange material. In such cases, it is, of course, necessary to make the parts of the mechanism and apparatus which come in contact with corrosive liquids of materials suitable to withstand the action of such liquids, or to line them with suitable protective coatings.

While I have described what I consider the best forms of my invention, modifications may be made without departing from the spirit of my invention and reference is therefore made to the appended claims for a definition of the scope of my invention.

What I claim is:

1. A valve mechanism for controlling flow through water treating apparatus having a tank containing a bed of ion exchange material, which comprises a valve body having therein an inlet chamber for connection to a source of water supply, a top chamber for connection to the top of said tank, a regenerant chamber for connection to a source of regenerating material, an outlet chamber for connection to a point of use, a bottom chamber for connection to the bottom of said tank, and a waste chamber for connection to a point of disposal, a flat face on said valve body, ports in said flat face arranged on a circle having eleven equally spaced port stations and including 3 ports in communication with said top chamber, one port in communication with said regenerant chamber, two ports in communication with said outlet chamber, two ports in communication with said bottom chamber, and two ports in communication with said waste chamber, a bonnet secured to said valve body and defining therewith a closed compartment, a passage in said valve body establishing permanent communication between said inlet chamber and said compartment, a rotor in said compartment having a flat surface opposed to said flat face on the valve body, ports in said rotor surface located on a circle having eleven equally spaced port stations matching the port stations in said flat face, an injector in said rotor, an inlet passage for said injector communicating with said compartment, an outlet passage for said injector communicating with one of said rotor ports, a suction passage for said injector communicating with another of said rotor ports, other passages in said rotor, said rotor ports and passages being so constructed and arranged as to establish various interconnections between certain of said body ports and said compartment in different angular positions of said rotor, and means for moving said rotor to different angular positions.

2. A valve mechanism for controlling flow through water treating apparatus having a tank containing a bed of ion exchange material, which comprises a valve body having therein an inlet chamber for connection to a source of water supply, a top chamber for connection to the top of said tank, a regenerant chamber for connection to a source of regenerating material, an outlet chamber for connection to a point of use, a bottom chamber for connection to the bottom of said tank, and a waste chamber for connection to a point of disposal, a flat face on said valve body, ports in said flat face arranged on a circle divided into eleven equally spaced port stations, said ports including in the order named three ports in communication with said top chamber, one port in communicating with said regenerant chamber, two ports in communication with said outlet chamber, two ports in communication with said bottom chamber, and two ports in communication with said waste chamber, there being a blank station without port between the first and second of those of said ports which are in communication with said top chamber, a bonnet secured to said valve body and defining therewith a closed compartment, a passage in said valve body establishing permanent communication between said inlet chamber and said compartment, a rotor in said compartment having a flat surface opposed to said flat face on the valve body, eleven equally spaced port stations on said rotor surface matching the port stations in said flat face, an injector in said rotor having an inlet nozzle opening into said compartment and an outlet nozzle opening into a port station in said flat surface, a suction passage communicating with said injector and terminating in a port in said surface at the port station adjacent to said outlet nozzle, a through opening extending through the entire thickness of said rotor at the second port station from said last named port, a cavity in said rotor surface extending over three port stations, there being one blank station between said through opening and said cavity and three blank stations between said cavity and said outlet nozzle, and means for moving said rotor to different angular positions.

ERIC PICK.

(References on following page)

REFERENCES CITED

The following references are of record in the file of this patent:

UNITED STATES PATENTS

| Number | Name | Date |
|---|---|---|
| 1,985,449 | Heggem | Dec. 25, 1934 |
| 2,076,321 | Pick | Apr. 6, 1937 |
| 2,093,692 | Daniels | Sept. 21, 1937 |
| 2,209,993 | McGill | Aug. 6, 1940 |
| 2,254,421 | Eickmeyer | Sept. 2, 1941 |
| 2,309,032 | Zimmerman | Jan. 19, 1943 |
| 2,364,697 | Daniels | Dec. 12, 1944 |
| 2,422,758 | Temple | June 24, 1947 |
| 2,428,410 | Daniels | Oct. 7, 1947 |